UNITED STATES PATENT OFFICE.

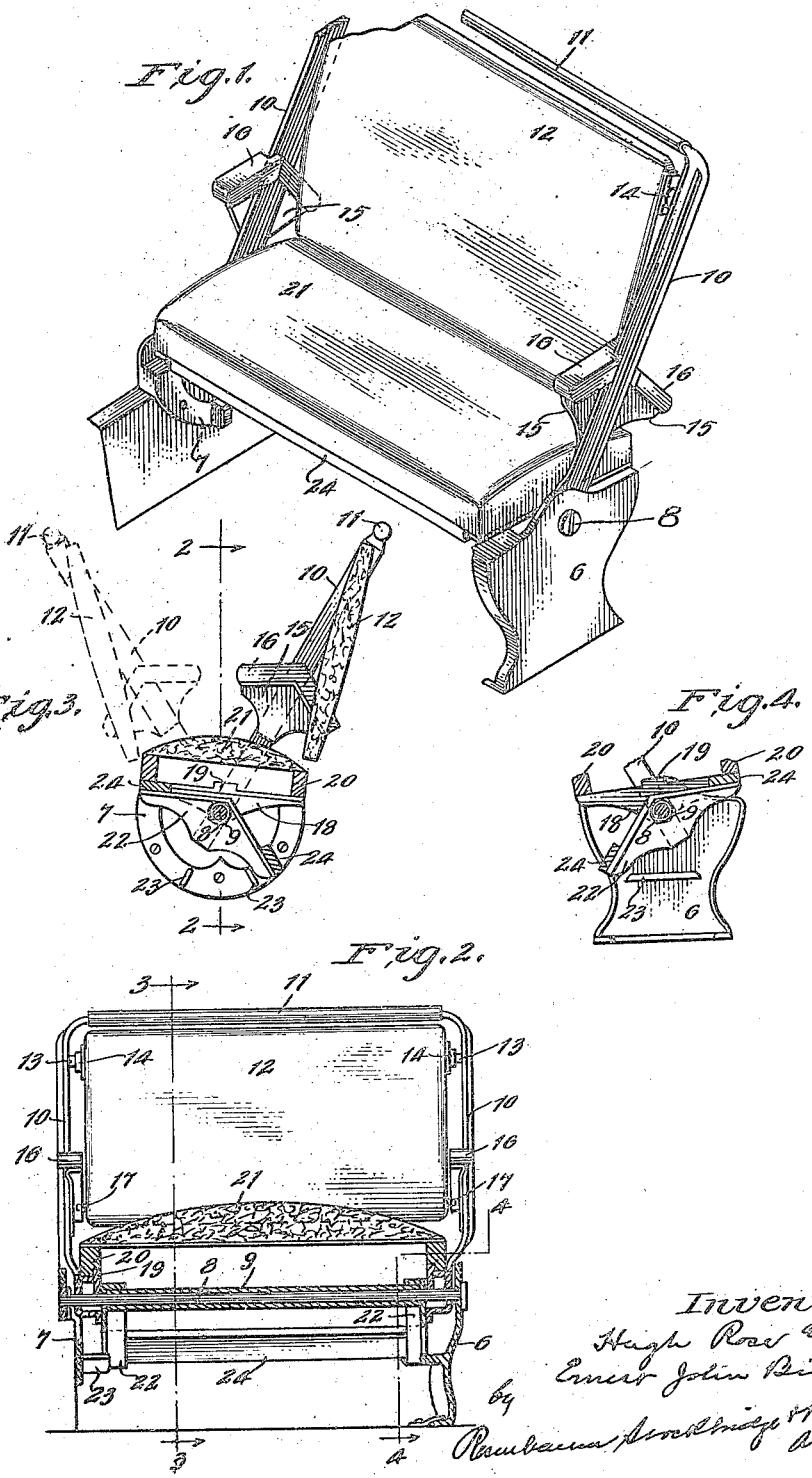

HUGH ROSE, OF STANMORE, NEAR SYDNEY, AND ERNEST JOHN BICKFORD, OF RANDWICK, NEAR SYDNEY, NEW SOUTH WALES, AUSTRALIA, ASSIGNORS TO FITT CHARLES PETRIE, TRUSTEE, OF SYDNEY, NEW SOUTH WALES, AUSTRALIA.

REVERSIBLE SEAT.

1,254,437.   Specification of Letters Patent.   Patented Jan. 22, 1918.

Application filed December 14, 1915. Serial No. 66,817.

*To all whom it may concern:*

Be it known that we, HUGH ROSE, a subject of the King of Great Britain, residing at No. 4 Holt street, Stanmore, near Sydney, in the State of New South Wales and Commonwealth of Australia, and ERNEST JOHN BICKFORD, a subject of the King of Great Britain, residing at Locksley, Greville street, Randwick, near Sydney aforesaid, have invented a new and useful Improved Reversible Seat, of which the following is a specification.

This invention relates to reversible seats wherein the rest member or seat proper or rest is usable in opposite directions by reversing the seat back to act as set on either edge of the rest and it has been specially devised to produce a handy reversible seat of strong and light and comparatively cheap construction and one in which the seat back adjustment requires but little space and is attained with little exertion, one providing clear access to all the space underneath from the front, and one which is specially suitable for railway and tramway cars and carriages and for places of public resort.

This improved reversible seat has two main or end frames inclusive of supporting standards or legs. Joining these end frames is an axle carrying arms or a frame radially operable within limits and supporting a back pivoted thereto. Each of these radial arms preferably carries two angularly set arm rests for use in either position of the back. Inwardly of these arms at each side is a seat bolster rockable within limits on the axle and carrying a seat mattress or cushion preferably removable. Inwardly again of each seat bolster is a frame connected to the lower ends of the radial arms and having radial extensions each carrying a bar adapted to form a foot rest for use in either position of the back and to offer no obstruction at the then back of the seat.

But in order that this invention may be readily carried into practical effect the preferred construction thereof will now be described with reference to the drawings accompanying and forming part of this complete specification in which Figure 1 is a perspective view of an improved reversible seat according to this invention, Fig. 2 a longitudinal section thereof on line 2—2 Fig. 3, and Figs. 3 and 4 transverse sections on lines 3—3 and 4—4 respectively of Fig. 2.

The main or end frames 6 and 7 are joined transversely by a central axle comprising a bolt 8 acting as a tie and an enveloping tube 9 acting as a stretcher. From the outer ends of the inner axle 8 and internally of the frames 6 and 7 loose radial arms 10 extend upwardly and preferable meet as a frame or bail 11 across the seat just inclosing the seat back 12. This seat back 12 is pivoted to the arms 10 preferably on gudgeon pins 13 in homings 14 one of which has a slot so that by withdrawing the pin 13 therethrough the back may be removed. The pivoting of the seat back 12 might be otherwise than on gudgeon pins on a through rod so long as the back is loosely hung so as to swing between the arms or within the back frame.

On the radial arms are brackets or bolsters 15 extruding back and front at suitable height and angle and straight or otherwise shaped to carry pads 16 adapted to form comfortable arm rests when the seat back is in either position. These bolsters 15 provide suitable stops for pins 17 or complementary devices on the edge of the seat back to limit the extent of its swinging movement. Supported on the inner axle 8 inwardly of the main frames is a frame or a pair of bolsters 18 free to rock within small limits and provided with projections 19 or other fixtures adapted to take into the frame 20 of a seat mattress or cushion 21 of such a size that its edges back and front respectively will closely meet the lower edge of the seat back 12 in both of its extreme positions.

Inwardly of each bolster 18 and affixed to the tube or stretcher member 9 of the axle is a footrail frame 22 connected to the radial arms 10 and moved therewith their movement being limited by stops 23 on the main frames. The footrail frames 22 are connected to each other at their two outer ends by rails or stretchers 24.

In use when it is desired to reverse the seat the radial or back supporting arm 10 is thrown over as shown in Fig. 3 carrying therewith the back 12 until the pins 17 meet the brackets 15 and the seat back swings into new position on its pivots 13. The footrail frames 22 move with the seat and the then forward rail 24 meets and partially supports the seat cushion frame at the desired angle and leaves free access under the seat, the other rail 24 being now adapted to act as a footrail for persons seated behind or at the back of the set seat.

It will be observed that the seat may be readily released by removing axle 8 whereupon the base plates of end-frames 6 and 7 may be pulled from under their fastening clamps.

It is to be understood that though the best known construction of this improved reversible seat is herein described and explained yet such construction may be varied without departing from the nature and scope of this invention.

Having now fully described and ascertained our said invention and the manner in which it is to be performed we declare that what we claim is:—

1. A reversible seat comprising a seat portion and end-frame supports, an axle connecting said end frames, seat bolsters pivoted on said axle, swinging arms pivoted on said axle, a back portion pivoted on said swinging arms, foot rests attached to said swinging arms and pivoted on said axle, and means for limiting the movement of said swinging arms.

2. In a reversible seat having seat and back portions and end-frame supports, the combination of an axle connecting said supports, seat bolsters pivoted on said axle, swinging arms pivoted on said axle, said back portion being pivoted to said swinging arms, arm-rests attached to said swinging arms, foot-rests attached to said swinging arms and pivoted on said axle, and means for limiting the movement of said swinging arms.

3. In a reversible seat having seat and back portions and end-frame supports, the combination of an axle connecting said supports, seat bolsters pivoted on said axle, swinging arms pivoted on said axle, said back portion being pivoted to said swinging arms, stops for limiting the pivotal movement of said back portion with respect to said swinging arms, arm-rests attached to said swinging arms, foot-rests attached to said swinging arms and pivoted on said axle, and means for limiting the movement of said swinging arms.

4. In a reversible seat having seat and back portions and end-frame supports, the combination of an axle connecting said supports, seat bolsters pivoted on said axle, swinging arms pivoted on said axle, said back portion being pivoted to said swinging arms, stops for limiting the pivotal movement of said back portion with respect to said swinging arms, arm-rests attached to said swinging arms, foot-rests attached to said swinging arms and pivoted on said axle, and stops on said end-frame supports for limiting the movement of said swinging arms.

5. In a reversible seat having seat and back portions and end-frame supports, the combination of an axle connecting and supporting said supports, bolsters pivoted on said axle, swinging arms pivoted on said axle, said back portion being pivoted between said swinging arms, arm rests attached to said swinging arms, stops on said arm rests for limiting the pivotal movement of said back portion, foot rests attached to said swinging arms and pivoted on said axle, and stops on said end-frame supports for limiting the movement of said swinging arms.

6. In a knockdown reversible seat, the combination with seat and back portions and end-frame supports, of an axle connecting and supporting said end-frame supports and fixedly mounted therein, swinging arms pivoted on said axle, foot rests attached to the lower extremities of said arms and also pivoted on said axle, said back portion being pivoted between the upper extremities of said arms, seat bolsters pivoted on said axle, means for limiting the pivotal movement of said back portion and means for limiting the movement of said arms, substantially as described.

7. In a reversible seat, the combination with a supporting structure and a seat portion, of an axle fixedly mounted in said supporting structure, seat bolsters pivoted on said axle, swinging arms pivoted on said axle, and a back portion pivoted on said swinging arms, substantially as described.

8. In a reversible seat, the combination with a supporting structure and a seat portion, of an axle fixedly mounted in said supporting structure, seat bolsters pivoted on said axle, swinging arms pivoted on said axle, foot rests attached to said swinging arms, and a back portion pivoted on said swinging arms, substantially as described.

In testimony whereof we have signed our names to this specification in the presence of two subscribing witnesses.

HUGH ROSE.
ERNEST JOHN BICKFORD.

Witnesses:
PERCY NEWELL,
I. EASTON.

Copies of this patent may be obtained for five cents each, by addressing the "Commissioner of Patents, Washington, D. C."